United States Patent
Waclawsky

(10) Patent No.: US 6,539,026 B1
(45) Date of Patent: Mar. 25, 2003

(54) APPARATUS AND METHOD FOR DELAY MANAGEMENT IN A DATA COMMUNICATIONS NETWORK

(75) Inventor: John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/267,745

(22) Filed: Mar. 15, 1999

(51) Int. Cl.$^7$ .................................................. H04Q 1/00
(52) U.S. Cl. ........................ 370/428; 370/252; 370/412
(58) Field of Search ................................. 370/412, 428, 370/429, 430, 252

(56) References Cited

U.S. PATENT DOCUMENTS

| | | | |
|---|---|---|---|
| 5,231,633 A | 7/1993 | Hluchyj et al. | 370/94.1 |
| 5,255,265 A | 10/1993 | Eng et al. | 370/60 |
| 5,268,900 A | 12/1993 | Hluchyj et al. | 370/94.1 |
| 5,317,562 A * | 5/1994 | Nardin et al. | 370/428 |
| 5,533,020 A | 7/1996 | Byrn et al. | 370/60.1 |
| 5,535,207 A | 7/1996 | Dupont | 370/80 |
| 5,793,747 A | 8/1998 | Kline | 370/230 |
| 5,796,719 A | 8/1998 | Peris et al. | 370/231 |

OTHER PUBLICATIONS

IEEE Standard Dictionary of Electrical and Electronics Terms, 1984, p. 714.*

\* cited by examiner

*Primary Examiner*—Brian Zimmerman
(74) *Attorney, Agent, or Firm*—Chapin & Huang, L.L.C.; Barry W. Chapin, Esq.

(57) ABSTRACT

A method and apparatus are provided for scheduling delays of data in a data communications device within a network. A network policy can be obtained and analyzed to determined various delay categories associated data having various attributes. The delay categories having associated delay values can be used to configure a number of storage locations preferably interconnected in a series. Each storage location has an associated delay. When data arrives, an attribute of the data allows a determination to be made of which delay category and therefore what delay is associated with the data. The data is then deposited into a storage location having an associated delay that generally corresponds to the delay associated with the data. The delay of data is adjusted over time for each storage location, preferably by shifting the data from one storage location to the next. When data exists in a storage location having a predetermined delay transmit value, it is transferred to a transmission buffer, at which point the data has been delayed by the prescribed amount specified in the network policy. The system allows changes to be made in the network policy which can be dynamically accounted for in the delay management configuration by reconfiguring the storage location to account for any added or removed data attributes and delay categories.

24 Claims, 7 Drawing Sheets

APPARATUS AND METHOD FOR DELAY MANAGEMENT IN A DATA COMMUNICATIONS NETWORK

BACKGROUND OF THE INVENTION

A typical data communications network includes many hosts interconnected by various data communication devices. The data communication devices can be routers, bridges, switches, access servers, gateways, hubs, proxy servers, repeaters and so forth which exchange data over an interconnection of data links. The data links may be physical cables or may be provided using wireless communication mechanisms. The network allows data to propagate between sending and receiving hosts. The sending and receiving hosts are often general purpose computer systems such as personal computers, workstations, minicomputers, mainframes and the like, or the hosts may be dedicated devices such as web-site kiosks, facsimile servers, video servers and so forth. Each host couples to one or more of the data communications devices that form the network.

Various physical data communications connection mechanisms allow hosts to interconnect with the network. Physical data communications connection mechanisms such as modems, transceivers, network interface cards, fiber optic cards, ports or other hardware devices allow data to be transferred at various maximum and minimum data transfer rates to and from the hosts. For example, certain hosts may have high-speed network interfaces which provide physical connections to the network at high data rates such as fractional T1, T1, E1 or higher, while other hosts may use an inexpensive modem that provides a maximum data transfer rate of 56.6 kilobits per second (Kbps) to and from the network.

Depending upon the specific use or application running on a host, different levels of service (i.e., data transfer rates) may be required for data transmitted to and from the host. For example, hosts that-connect or subscribe to networks using high speed connection mechanisms such T1 cards generally expect to be provided with, and often pay a premium for the ability to send and receive data at T1 data rates. Other hosts may not require such high data transfer rates and therefore only subscribe to the network and pay for the capability to transfer data at lower data transfer rates.

Since connections or data traffic flows from multiple hosts with potentially different data rates are frequently switched, routed or transferred through the same data communication devices in a network such as the Internet, the data communications devices must provide a way to distinguish the different data flows or connections requiring different levels of service (i.e., different data rates). Once distinguished, the data communications devices must be able to service each connection or flow at its prescribed level of service. Thus, data transmitted over a T1 link must generally be transported,through the network at T1 speeds, while data from a slower link should at least be transferred through the network at a minimum subscription rate. Management of the various delay requirements associated with data having differing levels of service is a well known problem associated with data communications devices in modern networks.

The problem of delay management also stems from the various types of data that can be transmitted through a network between sending and receiving hosts. For example, modem data, facsimile data, video data, voice data or other data types may all be transmitted using packets, cells, frames or another mechanism over a commonly shared network medium. Each of these data types may have certain Quality of Service (QoS) requirements with respect to how quickly that data must be transferred through the network.

Video and voice data, for instance, generally must be transferred in real-time over a network so that a receiving host can correctly reconstruct a video or voice signal from the data. If real-time transmission is not provided and the data is delayed too long in the network, the viewer or listener at the receiving host may experience drops outs or degraded service. Conversely, many types of modem data transmissions such as e-mail communications, for example, typically have no specific bandwidth, QoS, or delay requirements to be met as the data is propagated through the network. In between these two extremes, data such as facsimile data may require adherence to certain minimum protocol delay or quality of service requirements which do not rise to the demands of real-time transmission but which also cannot allow for significant delays in transmission.

Other examples of delay management can arise when certain data communication protocols require data to be delivered according to certain delay attributes. An example of this is the use of specialized protocols for remote sensing and process control applications, where data must be exchanged in a timely manner to correctly operate equipment in response to a stimulus. Whether delay requirements are due to varying data transmission rates, different data types, specialized protocols requiring minimum QoS levels or other concerns, the data communications devices in a network are generally responsible for managing the delay of data as it propagates through the network.

Various prior art schemes have been developed to allow a data communications device to handle the transfer of data at differing levels of service. Most involve providing separate data queues for the different types of data or different levels of service and use a weighted round-robin or other type of queue servicing algorithm or de-queuing mechanism to remove data for transmission from the various queues at different rates. For example, a high priority queue may be serviced twice as often as a low priority queue, thus allowing twice as much high priority data to propagate through the device. In this manner, prior art systems attempt to control delay and priority of data passing through the network using separate delay control mechanisms for each type of data.

SUMMARY OF THE INVENTION

Embodiments of the present invention relate to delay management, scheduling and controlling the delay of data passing through a data communications device in a data communications network. More specifically, the invention relates to a unique and flexible queuing, storage and delay scheduling mechanism that allows a delay scheduling process to delay data having various attributes.

According to one aspect of the invention, a delay manager apparatus and method are provided to schedule delays of data in a data communications device. The apparatus includes an input for receiving unscheduled data and a delay controller which includes a predetermined number of storage locations. The apparatus and method involve managing the delay of data in the data communications device by configuring a predetermined number of the storage locations. to store data passing through the data communications device, with each storage location having an associated delay.

A data scheduler is provided and is coupled to the input to receive the unscheduled data. The data scheduler determines a delay associated with the unscheduled data and deposits the unscheduled data into one of the predetermined number of storage locations in the delay controller. The selected storage location has a predetermined associated delay that generally corresponds to the delay associated with the unscheduled data. The delay controller includes a delay control processor which adjusts the associated delay over time of data deposited in each of the predetermined number of storage locations. A transmission buffer is coupled to the delay controller, and transmits data deposited into a storage location that has an associated delay equal to a predetermined delay transmit value. In this manner, the invention imposes delays on data passing through a data communications device.

Preferably, the delay manager also includes a policy controller coupled to the data scheduler and the delay controller. The policy controller receives a network policy which defines delay categories for data passing through the data communications device. The policy controller analyzes the network policy and provides control commands to the data scheduler and the delay controller which indicate to the data scheduler the delay categories that can be associated with the unscheduled data and also indicate to the delay controller the predetermined number of storage locations required to store data in each delay category. The control commands also indicate a rate at which to adjust the associated delay over time of data deposited in each of the predetermined number, of storage locations. The control commands establish a delay management configuration based on the network policy which allows data of different types to be scheduled together in a single mechanism. If the network policy changes, the invention can detect this and can adjust the delay management configuration to respond to the changes.

According to another aspect of the invention, the delay controller includes a series of interconnected registers and a first register in the series has the lowest associated delay and the last register in the series has the highest associated delay. The registers in the series located between the first and last register have incrementally increasing associated delay categories or delay time values. During configuration, the predetermined number of storage locations in the data controller are selected from the series of interconnected registers such that each selected register in the series represents a storage location having an associated delay equal to a delay category determined from the network policy. This allows the invention to be flexible in the event of network policy changes.

According to another aspect of the invention, the delay controller apparatus includes a speed controller or a speed and direction controller which adjusts the delay associated with data deposited into storage locations. This is done by decrementally shifting the data from storage locations having higher associated delay categories to storage locations having lower associated delay categories. When the data is shifted into the storage location having the lowest associated delay category, the speed or speed and direction controller transfers the data to the transmission buffer for transmission.

An embodiment of the invention also includes a method for managing delay of data in a data communications device. The method involves establishing multiple delay categories based on a network policy. The method further involves obtaining data and assigning a delay to the data based on which of the established delay categories an attribute of that data identifies. The delay assigned to data is then adjusted over time and the data is transmitted when the delay assigned to the data reaches a predetermined delay transmit value.

A more detailed method embodiment provides a method for managing delay of data in a data communications device by configuring a predetermined number of storage locations, preferably located within a delay controller, to store data passing through the data communications device, where each storage location has an associated delay. Data is then accepted, preferably by a data scheduler, and a delay associated with the data is determined by the data scheduler. The data scheduler then deposits the data into a selected storage location selected from the predetermined number of storage locations. The selected storage location has an associated delay generally corresponding to the delay determined to be associated with the data. The delay controller then adjusts the associated delay over time for data deposited in each of the predetermined number of storage locations. The data deposited in a storage location that has an associated delay generally equal to a predetermined delay transmit value is then transmitted, preferably to a transmit buffer.

According to another aspect of the invention, to establish the predetermined number of storage locations, a policy controller determines a required number of delay categories associated with data that can be transmitted through the data communications device. The number of delay categories is preferably based upon a network policy provided by a network policy server to the policy controller. Based upon the required number of delay categories, the policy controller computes the predetermined number of storage locations to establish. Preferably, the policy controller selects or allocates the predetermined number of storage locations from a series of interconnected registers. Next, a rate at which to adjust the associated delay over time for data deposited in each of the predetermined number of storage locations can be computed and communicated to the delay controller from the policy controller. The rate governs a direction and speed at which to traverse the predetermined number of storage locations in the delay controller to adjust the associated delay over time for data deposited in each of the predetermined number of storage locations. In this embodiment, the total number of the predetermined number of storage locations determines an overall maximum delay for data.

According to yet another aspect of the invention, to adjust the associated delay over time for data deposited in each of the predetermined number of storage locations, a speed controller in the delay controller transfers the data in each respective storage location to a storage location having a lower associated delay. As such, successive adjusting steps move data from storage locations having high associated delays to storage locations having lower associated delays. Delays may be increased in an alternative embodiment by shifting data in the reverse direction. Data is transmitted when the data is deposited in a storage location having a lowest delay transmit value, such as zero.

Depending upon the positioning of the invention in a data communications device, data can be accepted by a delay manager from a network port of the data communications device and this data can be transmitted to a data processor within the data communications device after the delay manager manages delays of the data according to the invention. In this instance, the delay associated with data is controlled as the data arrives at the data communications device. Alternatively, data can be accepted by the delay manager from a data processor within the data communications device and can be transmitted to a network port of the data communications device after being delayed, such that the delay associated with data is controlled as the data awaits transmission from the data communications device.

Embodiments of the invention can determine a delay associated with the data based upon can attribute associated with the data, such as a type of service associated with the data, a source or destination or the data, a protocol or application used to create or transfer the data, a data type associated with the data or another aspect of the data. The attribute may be contained within the data itself, or may be obtained from another indicator such as the source processor, interface, device, port or link that provided the data. Using these mechanisms, the invention can schedule data having different attributes.

The invention may be provided on a per port, per processor, per interface or per link basis, such that a single data communications device may have many delay managers configured according to the invention. In such embodiments, each delay manager manages delay for individual streams of data: flowing through respective ports, interfaces, links, and so forth. Alternatively, a data communications device may have a single delay manager configured according to the invention to manage and schedule delays for all data passing through the device.

According to another aspect of the invention, updates to the network policy can be obtained by the policy controller and the storage locations in the delay controller can be reconfigured during operation of the data communications device to allow controlling a delay for data transmitted through the data communications device according to the updates in the network policy. In this manner, a data communications device using the invention offloads from the network policy server the burden of distributing any updates to the network policy. This allows each device to obtain the updates from a network policy server as needed, instead of requiring the network policy server to actively distribute new policies all at once. This distributes the load on the network policy server.

Other embodiments of the invention include a computer program product including a computer-readable medium, such as a disk, including computer program logic encoded thereon. The computer program logic, typically in the form of object code, can execute on a processor. The code causes the processor, in conjunction with other mechanisms (i.e. memory, bus structures, interfaces, etc.) in a data communications device to control the delay of data according to the methods set forth herein. Thai is, the invention may be implemented as a software program that can be stored on a computer readable medium and can provide the delay functions and operation and storage locations with such mechanisms as source code that, when compiled and executed, can instantiate data structures including linked lists, queues, and other programming techniques that use memory and the processor and other mechanisms to store and manipulate data as explained herein. Generally, this embodiment of the invention includes software to implement the methods of the invention described above.

A data communications device equipped with the methods and apparatus of the invention is able to dynamically alter data traffic flow delay characteristics and delay management configurations as needed. In this manner, resources such as storage locations used by the invention within the device can be intelligently reserved only as required by the network policy.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
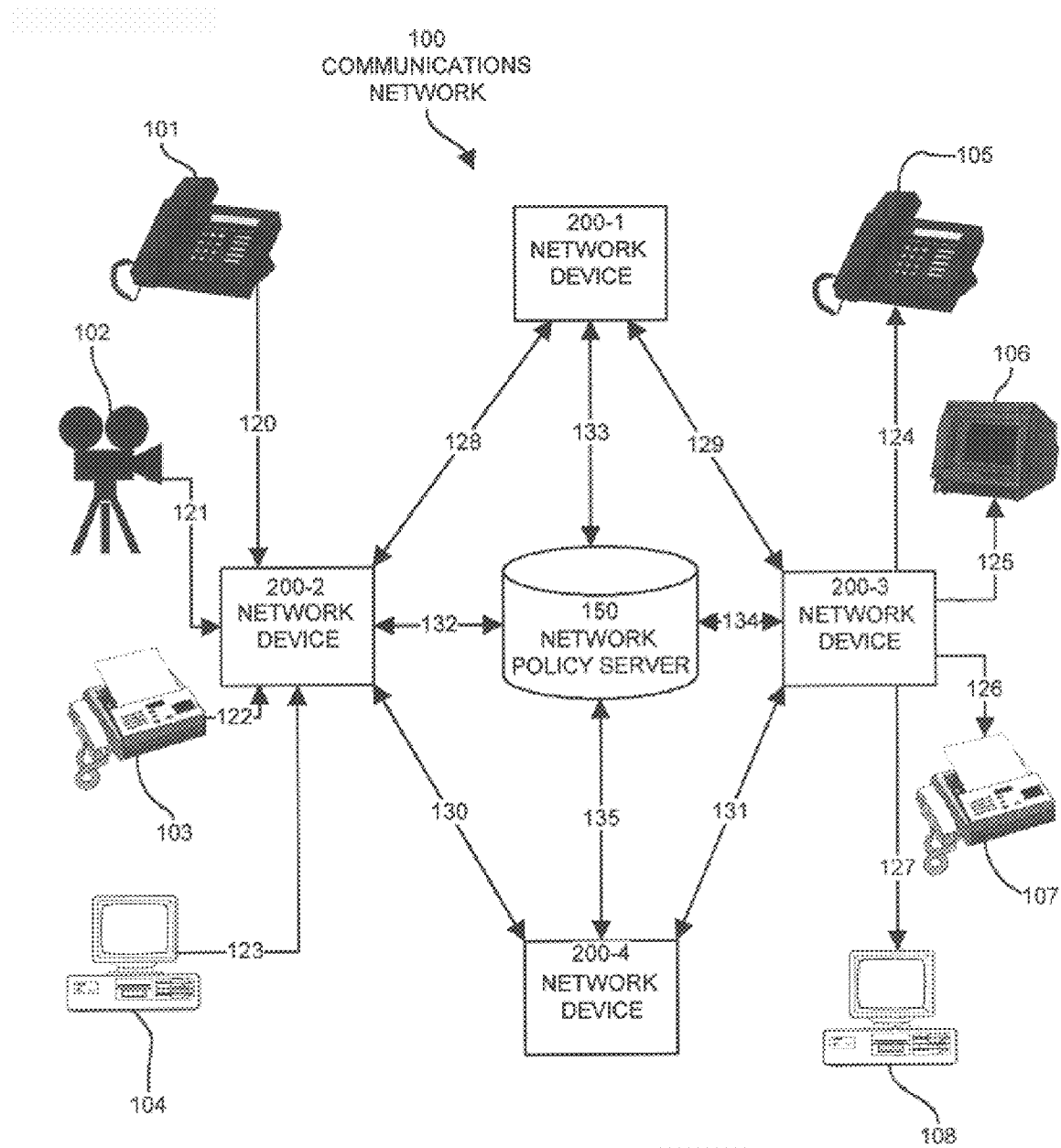
FIG. 1 illustrates an example data communications network configured for use in illustrating the principles of this invention.

FIG. 1 illustrates an example of a-communications network 100 configured to convey principles of the invention. The network 100 includes data links 120 through 135 which interconnect data communications devices 200-1 through 200-4, policy server 150, and hosts 101 through 108. The data links 120 through 135 allow communications to take place between the various components shown in the figure and can be any type of communication medium including physical network cables, wires, fiber optic links, any type of wireless transmission links or another communications medium. Though the network 100 is illustrated as a relatively small network, the invention is applicable to networks of all sizes, including local area networks (LANs), wide area networks (WANs), intranets, extranets, and conglomerations of many networks, such as the Internet, for example.

As illustrated, the hosts 101 through 108 may be different types of devices. The hosts 101 through 108 are illustrated as telephones 101, 105, video transmission and reception devices 102, 106, facsimile machines 103, 107 and computers 104, 108. The different types of hosts 101 through 108 are illustrated to aid in the description of certain principles of the invention and are not meant to be limiting.

The data communication devices 200-1 through 200-4 (collectively referred to as 200) provide the processing resources to propagate data through the network 100 between the hosts 101 through 108. The data communication devices 200 may be any type of data processing device that can transfer, switch, route or otherwise direct or propagate data in a network. Possible examples of data communications devices 200 are access servers, routers, switches, hubs, bridges, gateways, proxy servers, concentrators, repeaters, and similar data transfer devices, or any combination thereof. Preferred embodiments of invention are implemented primarily within the data communications devices 200 and allow each device 200 to manage delays, delay requirements and quality of service levels and/or delay guarantees associated with data being transferred through the network 100.

In operation, each host 101 through 108 sends and receives data via network 100. The data (not explicitly shown in this figure) is transmitted onto the network 100 from each host 101 through 108 and may have different associated data types. By way of example, suppose the host 102 is an on line video server that serves streaming video data over the network 100 to client receiving hosts, such as the host 106. Due to the nature of streaming video data, it must be transmitted from the video server host 102 and propagated in real-time over the network 100 to the client receiving host 106. The invention allows each data communications device 200-1 through 200-4 to configure itself to meet any minimum or maximum delay demands for the streaming video data.

The invention, among other things, establishes a delay management configuration within each data communications device 200. The delay management configuration may be established and controlled based upon data attributes such as a source of the data (i.e., video server host 102), a data type (i.e., streaming video), a destination of the data (i.e., client host 106), a type of service (TOS) associated with the data, a protocol used to transfer the data, or another attribute.

Further extending the above example, suppose that the computer host 104 does not have real-time requirements for data transfer, as does video host 102. Computer host 104 may be a home-based personal computer equipped with a 56.6 Kbps modem which subscribes to network 100 via an Internet Service Provider (ISP). As such, computer host 104 may simply be used for browsing web pages, transferring email, simple file transfer operations and the like. Due to the nature of the computer data (so named only to distinguish from video data in this example) transmitted through the network 100 from the computer host 104, the computer data can have an associated higher maximum allowed delay while propagating through the network 100. The data communications devices 200 of the invention can-distinguish between the slower transfer requirements (i.e. increased associated delay) of the computer data from computer host 104 versus the real-time requirements (i.e., decreased associated delay) of the video data from the video server host 102. In a single data communications device 200 equipped with the invention, each of these data types can be scheduled to be transferred within the delay requirements or delay categories associated with different data attributes using a single delay scheduling mechanism.

Also shown in FIG. 1 is a network policy server 150. There may be more than one network policy server 150, though only one is illustrated. Generally, the network policy server 150 distributes a network policy (not shown in FIG. 1) to the various data communications devices 200.

A network policy is obtained by each data communications device 200 and indicates, among other things, how different portions of data having different attributes are to be managed with respect to delays in transfer of the data in the data communications device 200. In other words, a distributed network policy provides, instructions for each data communications device 200 as to how to properly manage and control the delays of different data having different attributes as the data is transferred through the data communications device 200. The invention allows a data communications device 200 to analyze a network policy and dynamically configure itself to implement or apply the various types of delays that will be required to properly propagate data in the network 100 according to Quality of Service (QoS) levels or delay categories specified in the network policy.

Generally, the network policy can specify, among other things, maximum and/or minimum delays that can occur for data transfers through a data communications device 200 for data having attributes such as a specific data type, protocol, source, destination, application, or other attribute. A simplified example of a network policy is provided in Table 1 below:

TABLE 1

Example Network Policy Information

| | DELAY ATTRIBUTE | MAXIMUM DELAY CATEGORY | MINIMUM DELAY CATEGORY |
|---|---|---|---|
| 1 | TYPE = VOICE | 20 | 0 |
| 2 | TYPE = VIDEO | 10 | 0 |
| 3 | TYPE = COMPUTER | 100 | 10 |
| 4 | TYPE = FACSIMILE | 80 | 60 |
| 5 | SOURCE = HOST 101 | 20 | 0 |
| 6 | SOURCE = HOST 102 | 10 | 0 |
| 7 | DESTINATION = HOST 105 | 40 | 20 |
| 8 | PROTOCOL = V.32bis | 90 | 60 |
| 9 | PROTOCOL = H.110 | 30 | 0 |
| 10 | Type Of Service = 01110010 | 40 | 20 |
| 11 | Application = NetMeeting | 50 | 30 |

As indicated in the example network policy in Table 1, the DELAY ATTRIBUTE column specifies what characteristic or attribute of the data is to be used to determine delays associated with data having that attribute as it is transferred through the data communications device 200. In the MAXIMUM DELAY CATEGORY and MINIMUM DELAY CATEGORY columns, delay category values are listed which represent, for example, the number of units of time to delay data that corresponds to the associated delay attribute. The delay categories or units or time may equate to time values or time slots such as microseconds, milliseconds, seconds, or another scaled value which indicates delay periods or delay time for data matching the attribute in that row.

Alternatively, instead of numerical delay categories, the network policy may specify values such as high, medium or low, for example, to indicate high, medium and low delays for data matching the various attributes. In yet another alternative, the delay category values may be any value used by a formula, circuit, or other computation mechanism to determine a specific amount of delay associated with data having the corresponding attribute.

In the network policy in Table 1, rows 1 through 4 specify delay attributes of different data types. A data type may be, for example, voice, video, computer, facsimile or another type of data. For every delay attribute, maximum and minimum delay categories are specified in terms of actual delay values. If data is associated with the attribute in row 1, or TYPE=VOICE (i.e., the data is voice data), then the maximum delay category specified for voice data has a value of 20, and there is no minimum delay category value (i.e., 0 representing no minimum delay for voice data). If data has a delay attribute matching row 2, or TYPE=VIDEO, the network policy specifies that the maximum delay category for video data has a value of 10 and that there is no minimum delay (i.e., 0) for video. A minimum delay may be specified to ensure that some delay exists for data matching certain attributes, for example, to avoid buffer congestion problems at a receiver.

Other rows such as rows 7 and 8 in Table 1 specify delay categories for data associated with specific source attributes, such as hosts 101 and 102. For instance, the source attribute in row 5 indicates that data transferred through a data communications device 200 that originates from source host 101 must have a maximum delay no longer than 20 and that there is no minimum delay. As illustrated in FIG. 1, host 101 is a telephone and transmits voice data which has real-time requirements for transmission through the network 100. Other delay attributes may be established as well, such as a destination of the data (e.g., row 7), a protocol used to transfer the data (e.g., rows 8 and 9), a type of service (T.O.S.) of the data (as indicated by a bit field in the data for example), or an application that generates the data (row 11).

It is to be understood that the exact implementation, content or structure of a network policy is not governed by this invention. The example network policy in Table 1 is given by way of example only and is used to illustrates principles of this invention. Network policies distributed from the network policy server 150 may be simpler or more complicated than that shown in Table 1. A simpler example may merely indicate high or low as a delay level for each delay category. Such a network policy may specify, for example, that all network traffic. generated by the Stock Exchange has a very high priority, and that all data traffic generated by the NetMeeting conferencing application has a low priority.

Preferably, network policies are distributed network-wide by the network policy server 150 to all of the data communications devices 200, via a protocol such as the Simple Network Management Protocol (SNMP). Alternatively; network policies may be individually downloaded or copied to each data communications device 200 from a console of the device or from a computer readable medium such as a transportable disk (e.g., floppy disk).

Through the use of distributed network policies, the data communications devices 200 of this invention can dynamically alter, update or reconfigure an existing delay management configuration to accommodate changes in the network policy. For instance, if the network policy in Table 1 is initially distributed, but then changes at a later time with the addition of more delay attributes and categories, the invention allows the data communication devices 200 to obtain the new policy and to dynamically reconfigure their internal delay management configuration.

Figure 2:
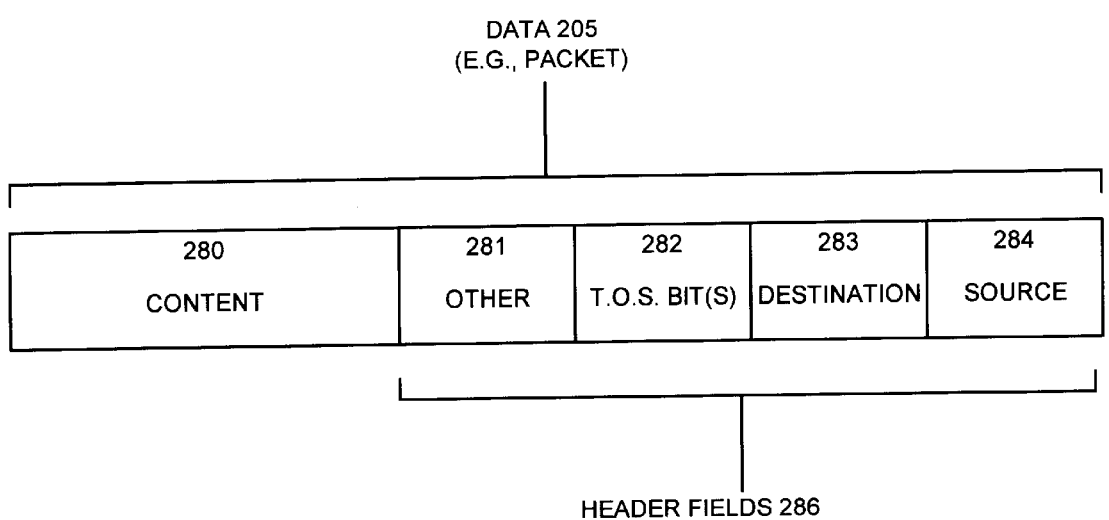
FIG. 2 illustrates an example of the structure of data in the form of a packet that can be processed by a delay manager configured according to the invention.

FIG. 2 illustrates how an attribute of data 205 may be determined by a data communications device 200. The sample data 205 in this figure is arranged as an Internet Protocol (IP) packet having a number of header fields 286 (i.e., fields 281 through 284) and a content field 280. When the data 205 (i.e., the packet) enters one of the data communications devices 200, that device 200 can analyze any information or fields 280 through 284 within the data 205 to determine a delay attribute associated with the data 205. By way of example, the type of service field 282 is an eight bit field identifying the type of service associated with the packet of data 205. The eight bits of information in the type of service field 282 can be analyzed upon receipt of the packet of data 205 to determine a type of service attribute associated with the packet. In a similar manner, other fields such as the source 284, destination 283, or content 280 may be analyzed to determine attributes associated with the data 205. Alternatively, a delay attribute such as the source of the data (i.e. Row 5 in the Network Policy in Table 1) may be determined from the physical interface upon which the data entered the data communications device 200.

Figure 3A:
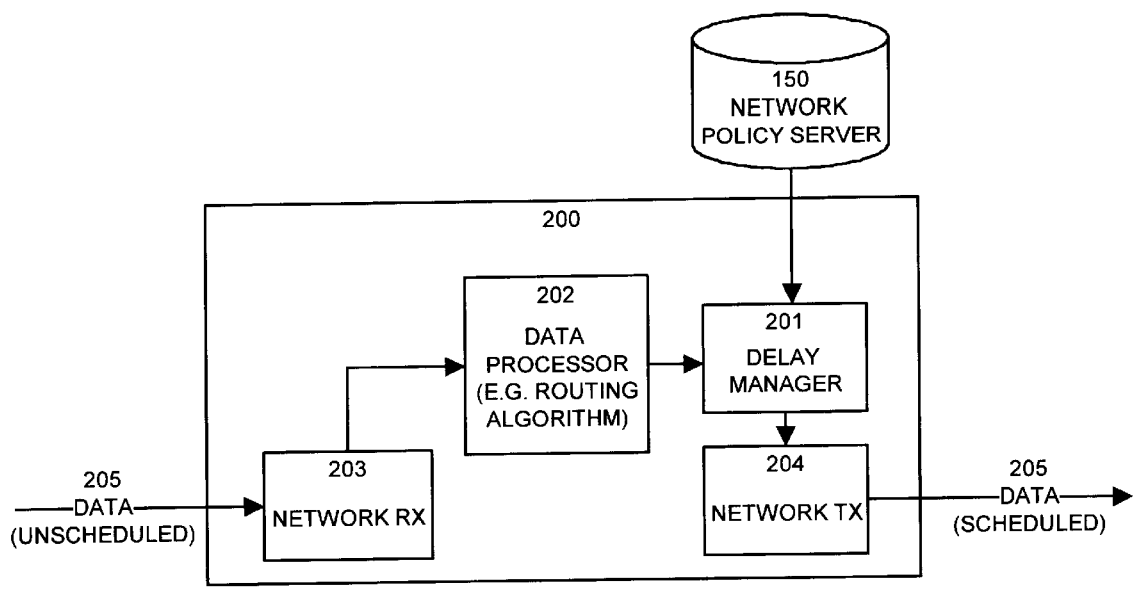
FIG. 3A illustrates a data communications device configured with a delay manager according to one embodiment of the invention.
Figure 3B:
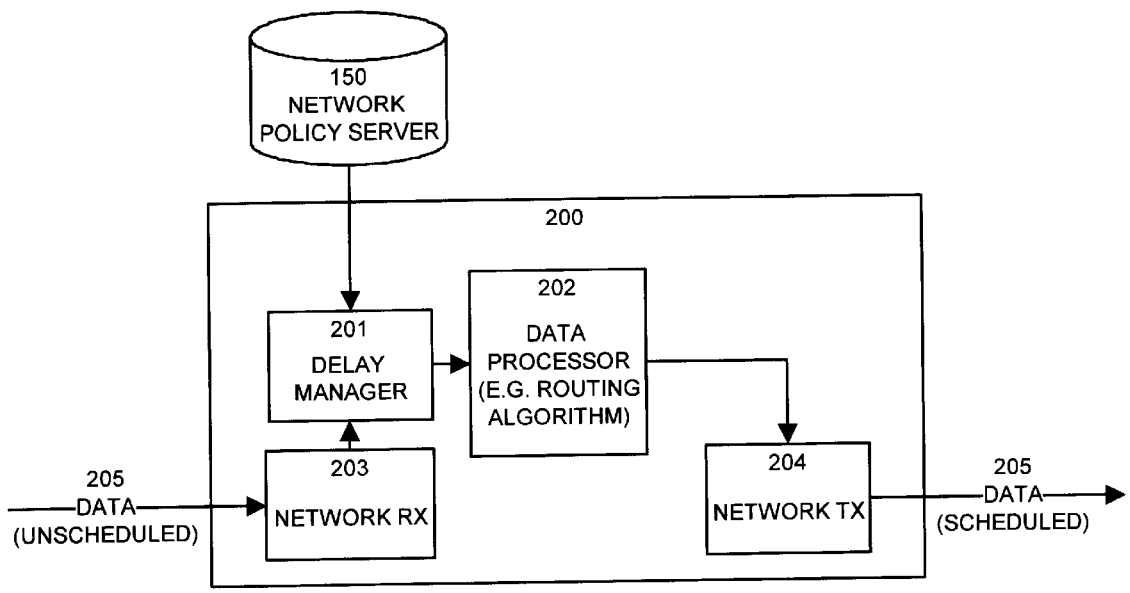
FIG. 3B illustrates a data communications device configured with a delay manager according to another embodiment of the invention.

FIGS. 3A and 3B illustrate high-level internal architectures of a data communications device 200 configured according to the invention, such as those used in network 100 (FIG. 1). FIGS. 3A and 3B illustrate how the invention can be used to control delay in various locations within a data communication device 200.

In both FIGS. 3A and 3B, the data communications device 200 includes a network receiver port 203 (NETWORK RX) which receives unscheduled data 205 from a data link 120 through 135 (FIG. 1) on network 100. By unscheduled data, what is meant is that no delay management or delay scheduling has yet been imposed on the data 205 entering the device 200.

Unscheduled data 205 may exist in any arrangement or size, but preferably is arranged in a predefined format such as a packet, datagram, cell, frame, token, block or other data structure that can be easily transferred over a network. Preferably, the unscheduled data 205 is received by the network receiver port 203 as a series of Internet Protocol (IP) packets, framer-relay frames, or as a stream of Asynchronous Transfer Mode (ATM) cells.

In the embodiment shown in FIG. 3A, once the unscheduled data 205 is received, it is transferred via a transmission buffer (not shown in this figure) to a data processor 202 which processes the data according to functionality provided by the data communications device. For example, if the device 200 is a router, the data processor 202 may implement a routing algorithm to determine where the data 205 is to be routed within the network 100 by selecting the next physical connection onto which the data should/will be transferred. After the unscheduled data 205 is processed in data processor 202 in the embodiment in FIG. 3A, it is transferred to the delay manager 201, which in a preferred embodiment implements the delay management aspects of the invention.

The delay manager 201 is responsible for imposing delay characteristics on the unscheduled data 205 as defined in the network policy obtained from the network policy server 150 (as discussed above). Thus in this embodiment, the delay manager 201 schedules processed, but unscheduled data 205, to produce scheduled data 204 which is then transferred to a network transmitter port 204 (NETWORK TX) which includes a transmission buffer (not shown in this figure) for transmission onto network 100. In other words, in one embodiment of the invention, the delay associated with the data 205 is controlled or managed after it has been processed and as the data awaits transmission from the data communication device.

The data communication 200 device in FIG. 3B operates in a similar manner as the device 200 in FIG. 3A, except that the delay manager 201 is coupled between the network receiver 203 and the data processor 202. As such, the network receiver port 203 accepts unscheduled data 205 from one of the data links 120 through 135 and passes the unscheduled data 205 directly to the delay manager 201. The delay manager 201 uses a current delay management configuration configured according to this invention to impose the delay characteristics defined in the network policy 207 on the unscheduled data 205 to produce scheduled data 205. The scheduled data is. then transmitted to the data processor 202 within the data communications device 200, such that any delay associated with the data 205 is controlled before processing (e.g., routing) the data 205. In other words, the delay of data 205 is managed as the data 205 arrives at the data communications device 200. The embodiments shown in FIGS. 3A and 3B identify either the processor 202 or the network transmitter 204 (i.e. the physical interface, link, port or network connection) as the bottlenecks to which the delay manager 201 feeds scheduled (i.e. delay managed) data 205.

Figure 4:
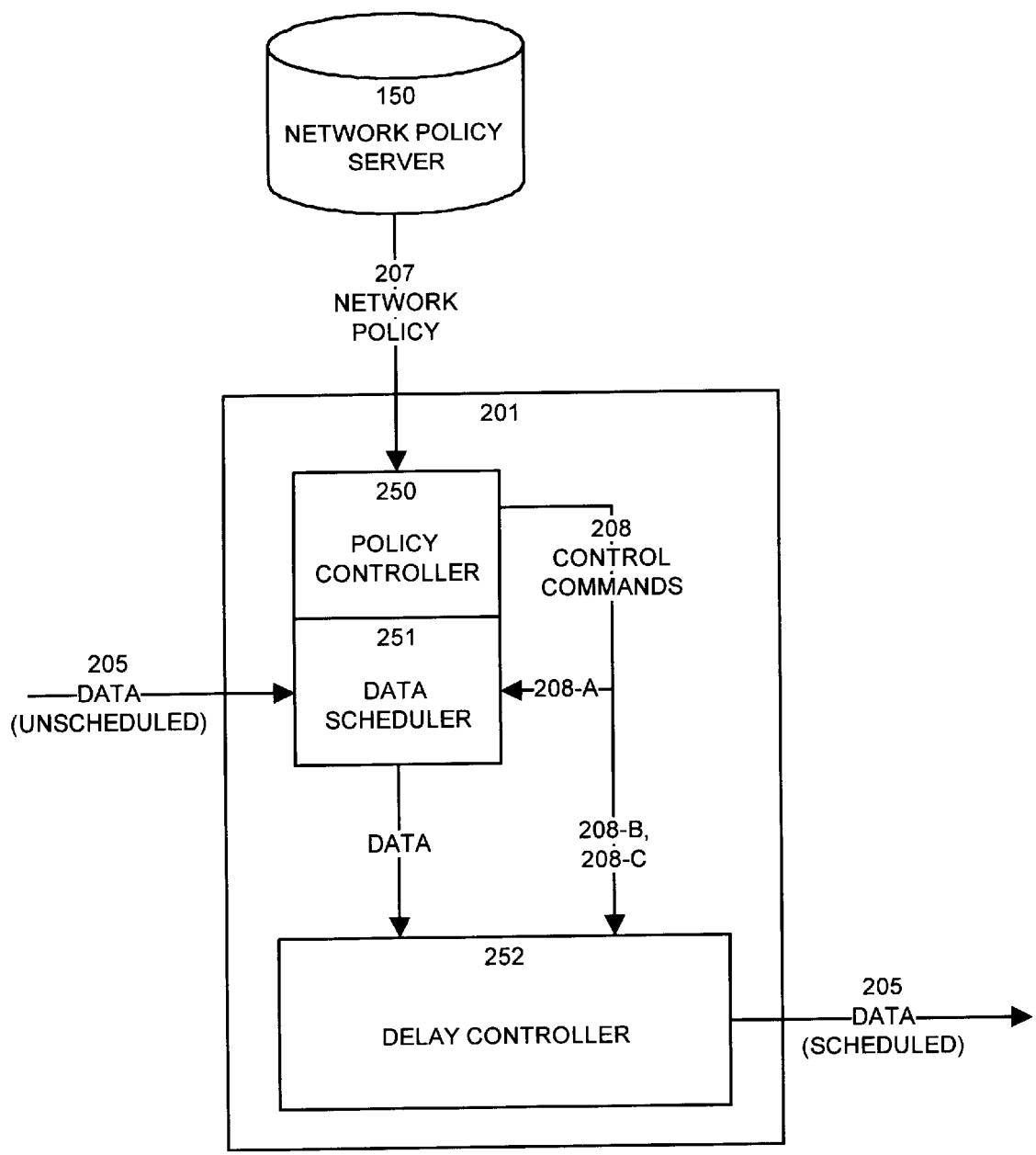
FIG. 4 illustrates an internal architecture of a delay manager configured according to one embodiment of the invention.

FIG. 4 illustrates the internal architecture of the delay manager 201 configured according to the invention. The delay manager 201 includes a policy controller 250, a data scheduler 251 and a delay controller 252.

To perform delay management according to this invention, the policy controller 250 is coupled to the network policy server 150 to receive the network policy 207. As explained above, the network policy 207 defines various delay attributes and associated delay categories for data that can be transferred (i.e., routed, switched, bridged, etc.) through the data communications device 200. The policy controller 250 analyzes the network policy 207 and provides control commands 208-A to the data scheduler 251 and control commands 208-B and 208-C to the delay controller 252 to establish a delay management configuration based on an analysis of the network policy 207.

The control commands 208-A are provided to the data scheduler 251 and indicate the various delay attributes and associated delay categories that can be associated with the unscheduled data 205. The control commands 208-A may include the entire list or a subset of the delay attributes along with the associated maximum (and/or minimum) delay categories obtained from the network policy 207. During the transfer of data 205, this information allows the data scheduler 251 to accept the unscheduled data 205 and to determine one or more delay attributes associated with the unscheduled data 205 by comparing information in the data 205 against the various delay attributes, as explained with respect to FIG. 2. When the delay attribute for data is determined, the data scheduler 251 can use the associated maximum (or minimum) delay category to define or determine the delay associated with the data 205.

The control commands 208-A also allow the data scheduler 251 to direct the unscheduled data 205 to an appropriate destination in the delay controller 252 for delay management. In a preferred embodiment, when a delay category (i.e., delay value) of the unscheduled data 205 is determined based on a delay attribute of the data (i.e., by determining its type, source, destination, application, type of service, protocol or another attribute), the data scheduler 251 transfers the data 205 to a specific appropriate storage location (which will be explained in more detail shortly) within the delay controller 252 based upon the delay determined to be associated with the data. A storage location (not shown in this figure) within the delay controller 252 is selected from a predetermined number of storage locations and has an associated delay category or delay value that generally corresponds to the delay (i.e., delay category from network policy) determined to be associated with the data.

The control commands 208-B and 208-C are sent from the policy controller 250 to the delay controller 252 and indicate how to establish a delay management configuration that allows the delay manager 201 to accurately delay the data 205. Preferably, the delay management configuration in the delay controller 252 is configured once before the data communications device 200 begins to transfer data 205, and can then be re-configured thereafter on an as needed basis. When the delay controller 252 receives the control commands 208-B and 208-C, it configures a predetermined number of storage locations (not shown in this figure) to store the data 205 passing through the data communications device 200. Each storage location that is configured has an associated delay generally corresponding to one of the delay categories of the network policy 207.

Once the data scheduler 251 and the delay controller 252 have been configured with the delay management configuration as explained briefly above, the delay manager 201 can being to manage the delay of data 205 transferred through the data communications device 200.

To manage the delay of data 205 transferred through the data communications device 200, the data scheduler 251 is responsible for accepting the unscheduled data 205 as input to the delay manager 201. The data scheduler 251 is also responsible for determining a delay associated with the data 205 and depositing the data (i.e., packet, cell, frame, block, etc.) into an appropriate storage location (not shown in this figure) within the delay controller 252. The delay. controller 252 is then responsible for tracking or imposing the associated delay on the data 205. When the delay associated with the data 205 has been achieved or imposed, or in other words, when the delay controller 252 has sufficiently delayed the data 205 for the specified amount of time indicated by the delay category for that data (as specified in the network policy 207), the delay controller 252 transmits the data from the delay manager 201 as scheduled data 205.

It should be understood that the data 205 may be a series of unrelated portions (i.e., packets, cells, frames, blocks, and other delimited data) of data. As such, each portion can be processed by the delay manager 201 individually, and each may match a different delay attribute in the network policy 207 and therefore may have a different associated delay. In this manner, a single delay manager 201 can be used to schedule multiple portions of data 205 having different delay attributes and each individual portion of data 205 may require different amounts of delay. That is, different service or Quality of Service levels can be maintained by the delay manager 201.

It should be understood that while the figures illustrate a data communications device 200 configured with a single delay manager 201, the invention is not limited as such. Rather, the invention may include embodiments of data communications devices 200 that have multiple delay managers 201. Such configurations may include having a separate delay manager 201 configured as described herein on a per port, per interface, per processor, per bus, per link or per source basis, or any combination thereof. That is, there may be, for instance, a delay manager 201 to manage the delay of data 205 arriving or being transmitted on each network interface 203, 204 (i.e. after each network interface 203 and/or before each network interface 204). Thus, a data communications device having 32 ports might be equipped with 32 separate delay managers 201, each managing the delay and scheduling data: 205 for each port. In an alternative configuration, within a single data communications device 200, there may be some delay managers 201 for handling delays of arriving data 205 (i.e., as in FIG. 3B), while other delay managers 201 may be provided for handling delay management of data waiting to be transmitted (i.e., as in FIG. 3A). Alternatively, a single delay manager 201 may be provided to handle delay management of all data 205 that passes through a single data communications device 200.

Figure 5:
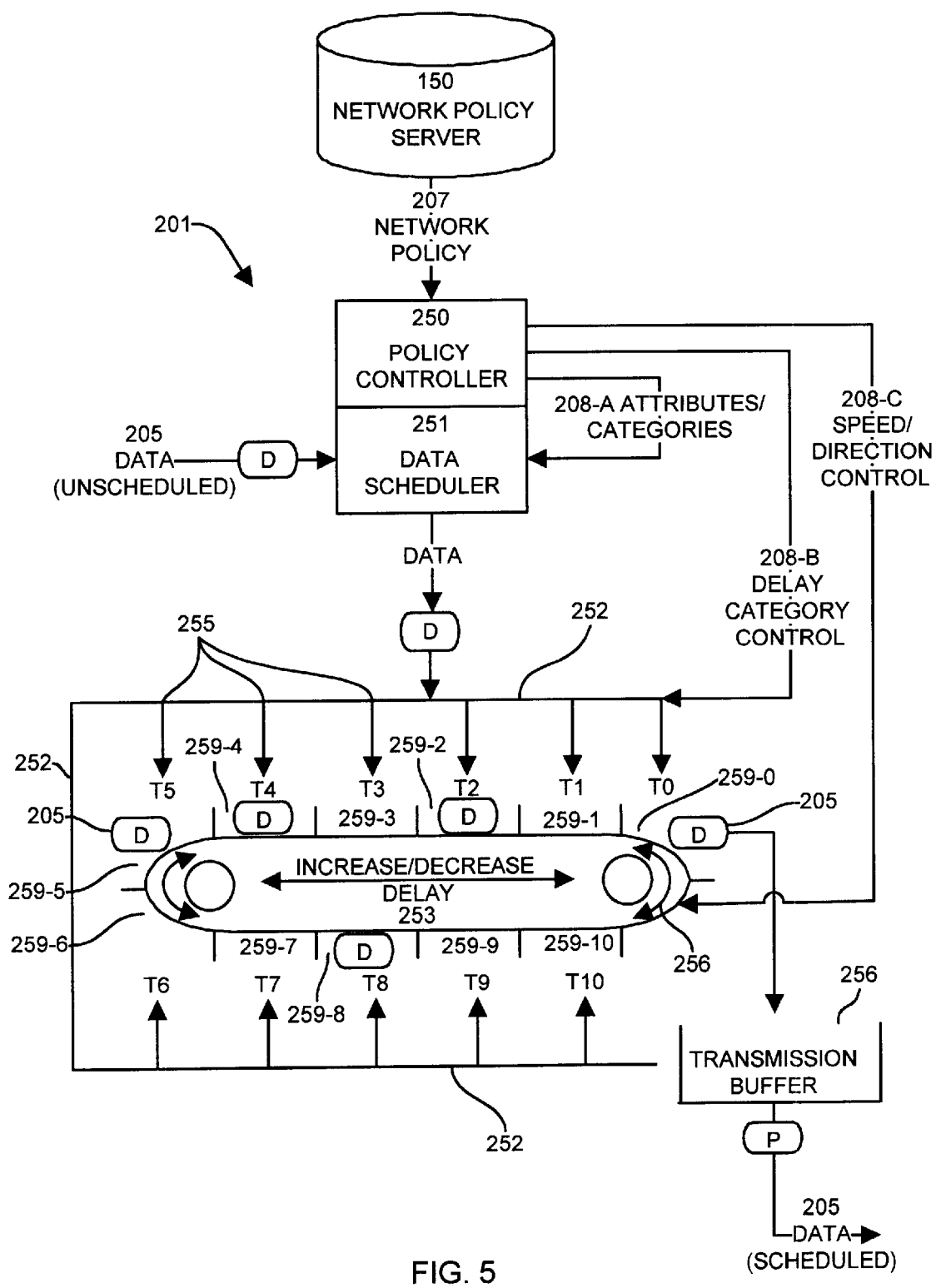
FIG. 5 illustrates a data flow diagram of data as it is processed through a data communications device configured with a delay manager according to one embodiment of the invention.

FIG. 5 illustrates a more detailed embodiment of the delay management configuration and data flow within the delay manager 201. In the illustrated configuration, various portions of data 205 are illustrated in transit at various points throughout the delay manager 201. Each portion of data 205 is illustrated as a packet-like object or structure labeled with a "D" for data. Each portion of data 205 represents, for example, a packet, cell, frame or other definable amount of data which can be transferred by a data communications device 200.

Figure 6:
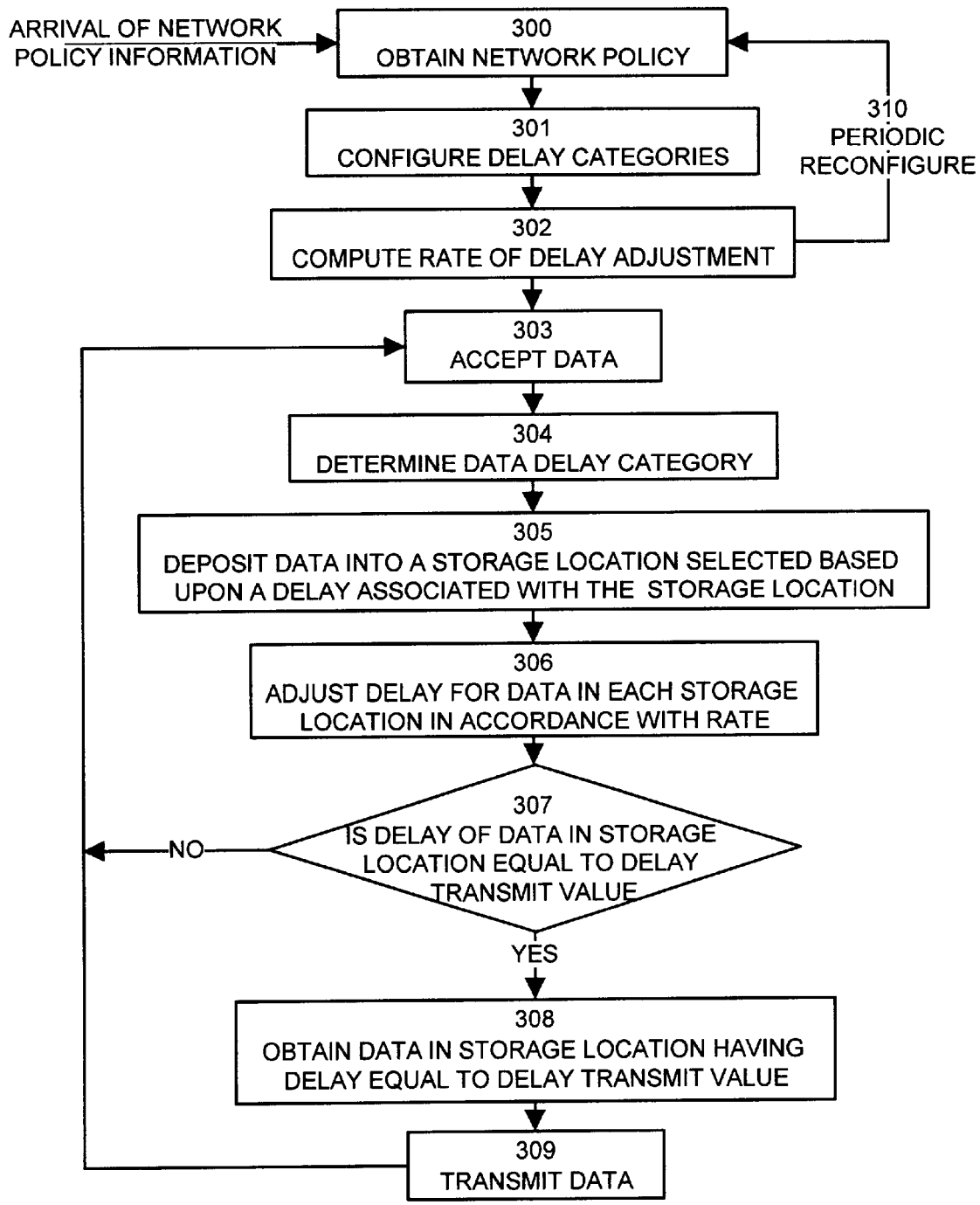
FIG. 6 is a flow chart of processing steps performed to manage delays of data in a communications device configured according to one embodiment of the invention.

The description of the elements in FIG. 5 and their operation will be provided in conjunction with the flow chart in FIG. 6. A brief summary of the mechanisms illustrated in FIG. 5 and their operation shown in FIG. 6 will provide an overview of embodiments of the invention, followed by a more detailed explanation and variations thereafter.

In step 300 in FIG. 6, the policy controller 250 obtains the network policy 207 from the network policy server 150. In step 301, the policy server 250 configures a delay management configuration including a number of delay categories 255 by allocating storage locations 259 within the delay controller 252 and by providing delay category and data attribute information to the data scheduler 251 via control commands 208-B, and 208-A, respectively. Certain configured storage locations 259 (i.e., 259-0 through 259-10 in this example configuration) thus have an associated delay (i.e. delay category). The policy controller 250 computes a rate of delay adjustment in step 302 and provides this to the delay controller 252 via control commands 208-C. The computed rate governs how frequently the delay of data 205 deposited into the storage locations 259 is adjusted over time.

Once the delay management configuration is complete, in step 303, the data scheduler 251 in the delay manager 201 (FIG. 4) begins to accept unscheduled data 205 as the data 205 travels through the data communications device 200 (i.e., as in FIGS. 3A and 3B). In step 304, the delay scheduler 251 analyzes the unscheduled data 205 in conjunction with the network policy information obtained via control commands 208-A to determine a data delay category (i.e. one of delay categories 255) associated with the data 205. Then, in step 305, the data scheduler 251 deposits the data 205 into a selected storage location 259-0 through 259-10 in the delay controller 252. The specific storage location 259 that is selected in step 305 is based upon-a delay (i.e., delay category 255) associated with the storage location 259 that generally matches the delay determined to be associated with the data (step 304).

In step 306, the delay controller 252 periodically adjusts the delay for data 205 in each storage location 259 in accordance with the adjustment rate determined in step 302. After each delay adjustment, the delay controller 252, in step 307, determines if data 205 in a storage location 259 has a delay that is equal to a delay transmit value, such as zero. If so, the delay controller 252 processes step 308 which obtains the data 205 in the storage location 259 having an associated delay equal to a delay transmit-value and transmits the data 205 in step 309 to the transmission buffer 256 for transmission from the delay manager 201 (FIG. 4) to either the network transmitter (FIG. 3A) or to another processor 202 in the data communications device 200 (FIG. 3B). In this manner, the steps in FIG. 6 allow the invention to schedule and manage delays of data of varying attributes.

As discussed briefly above, step 300 is performed upon start-up of a data communications device 200, when the policy controller 250 within the delay manager 200 obtains the network policy 207 from the network policy server 150.

Next, as indicated by step 301, the policy controller 250 analyzes the network policy 207 and establishes or configures multiple delay categories 255 in the delay controller 252 using the delay category control commands 208-B. Each delay category 255 may correspond to one or more storage locations 259 within the delay controller 252. Thus, once the policy controller 250 determines how many delay categories 255 are required for use in the delay manager 201 (based on the analysis of the network policy 207), one or more delay category control commands 208-B are sent to the delay controller 252. Preferred implementations and allocation of the storage locations 259 will be discussed in more detail with respect to FIGS. 7A and 7B.

More specifically, the delay category command(s) 208-B specify how many delay categories 255 are to be established in the delay controller 252, and also specify a delay time or range (T0 through T10) for each category. The delay controller 252 receives the delay category control command(s) 208-B and allocates a predetermined number of storage locations 259, with each storage location 259 having an associated delay (i.e. delay categories 255), as represented by T1 through T10. The exact predetermined number of storage locations 259 allocated is preferably related to the number of different delay values for the delay categories 255 detected in the network policy 207. For example, the storage location 259-0 (FIG. 5) has an associated delay category 255 represented by T0, which represents one of the delay categories (i.e., a maximum or minimum delay value) of at least one of the delay attributes listed in the network policy 207.

As illustrated in the example configuration in FIG. 5, there are eleven delay categories (255) T0 through T10 which correspond to the various maximum and/or minimum delay categories specified in the network policy 207 shown in Table 1 above. Thus, as part of the analysis of the network policy 207 shown in Table 1 (i.e., part of step 301), the policy controller 250 sends one or more control commands 208-B to the delay controller 252 to establish storage locations 259 that correspond to the delay categories (255) T0 through T10, which have associated delay values of 0, 10, 20, 30 . . . 100, respectively. Note that the storage locations 259 are illustrated as being interconnected in a circular or conveyor-belt manner 253 to illustrate how data can be shifted from one location 259 to another.

It should be understood that in this simple configuration, only a single storage location 259 having an associated delay T0 through T10 is illustrated for each different delay category from Table 1. In a alternative embodiment, there are many more than one storage location 259 provided for use to store data 205 that is being delayed. That is, there can be multiple storage locations allocated to hold data 205, but as will be explained, the data 205 preferably enters the entire set of allocated storage locations 259 at certain storage locations that corresponding to the delay categories 255 (i.e., having certain associated delays).

By way of example, the delay categories in the network policy in Table 1 range from a low of 0 to a high of 100. These delay category values, as noted previously, can represent time slots or time values such as seconds, tenths of a second, microseconds, milliseconds or another measure of time. Alternatively, delay category values may be scaled values used by a formula to compute an exact delay time for data 205 that matches an associated delay attribute. Since the delay attributes from the network policy in Table 1 have both maximum and minimum associated delay categories (i.e., maximum and minimum associated delays), data 205 that matches an attribute in the network policy 207 can be delayed (by the mechanisms described herein) for any amount of time between the maximum and minimum delay category values. As such, based upon the network policy 207 from Table 1, 101 separate consecutive storage locations 259 can be configured or established using the delay category control command(s) 208-B with each storage location 259 having an associated delay timeslot or value ranging from 0 to 100.

To be more specific, suppose the delay category values in the network policy 207 in Table 1 measure microseconds of delay. As specified in row 7, any data 205 having a network destination equal to "Host 105" is required to have a maximum delay time of no more than 40 microseconds within any one data communications device 200, and must have a minimum delay of at least 20 microseconds. As such, in a preferred embodiment, the delay category control commands 208-B may be used, for example, to configure a storage location 259 for every microsecond of delay that can occur between the maximum and minimum delays of 40 and 20. In other words, 20 separate storage locations 259 would be allocated in the delay controller 252, and each would be given an associated delay value ranging from 20 to 40 microseconds.

In one embodiment, if a delay category value is detected in the network policy 207, but there is already a storage location 259 allocated for the delay category value, step 301 does not allocate another storage location. Thus, if the first attribute analyzed in the network policy 207 has a maximum delay category value of 100, and a minimum of 0, the preferred embodiment allocates 101 storage locations having associated delays ranging from 0 to 100. If all other attributes in the network policy 207 have delay category values falling between 0 and 100, there is no need to allocate other storage locations 259, as there is at least one storage location 259-0 through 259-100 that is already allocated for any possible delay category value.

Thus, for the network policy in Table 1, 101 storage locations 259 may be allocated, each having a respective delay value ranging from 0 to 100. In this manner, the delay category control commands 208-B can be used by the policy controller 250 to control how many storage locations 259 are set aside, allocated or configured for each delay category that is to be established.

In another implementation that may be preferable for high bandwidth applications, there may be many storage locations 259 allocated in step 301 (FIG. 6) for each delay category 255 and for all timeslots or delay values there between. That is, while the figures show only one storage location 259 per delay category 255, there can be many more than one storage locations 259 allocated in step 301, depending upon the implementation or intended use. By way of example, in a data communications device 200, if many portions of data 205 arrive from many different network ports, interfaces or links (i.e. many network receivers 203 as illustrated in FIGS. 3A and 3B) at the same time, and all or some portions require the same amount of delay, each portion of data 205 can be placed into one of many separate storage locations 259 (as will be explained) which all collectively have the same associated delay category value.

The exact number of storage locations 259 that get allocated in step 301 may be implementation dependent, and may be based on factors such as overall network bandwidth, intended uses of-the device 200, or other throughput considerations required for a device 200 using the invention. Those skilled in the art should understand that the invention is meant to be general in nature and that such variations are intended to be within the scope of the various embodiments of the invention.

Figure 7A:
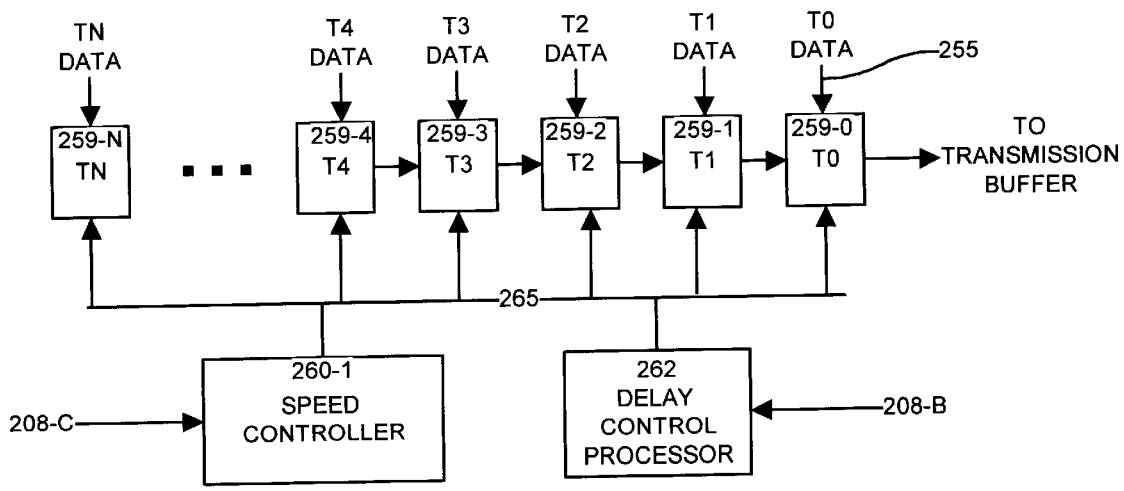
FIG. 7A illustrates a configuration of interconnected storage locations capable of unidirectional delay management in a delay manager configured according to one embodiment of the invention.
Figure 7B:
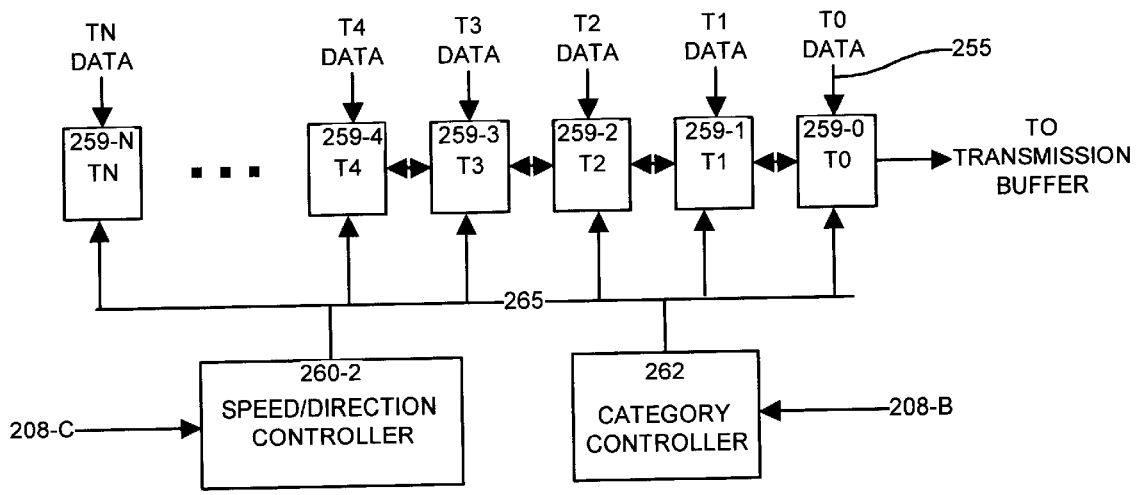
FIG. 7B illustrates a configuration of interconnected storage locations capable of bi-directional delay management in a delay manager configured according to one embodiment of the invention.

FIGS. 7A and 7B illustrate various arrangements of the delay controller 252, including the storage locations 259 that are configured with delay categories 255 by step 301 in FIG. 6. The structure and mechanisms in FIGS. 7A and 7B allow the delay of data 205 to be adjusted over time, which is a step of processing that will be discussed in more detail later. The configuration and general mode of operation of the structures in FIGS. 7A and 7B will be explained next, with the use within the overall operation of the invention to be covered thereafter.

In FIG. 7A, the storage locations 259-0 through 259-N are coupled in series to each other from left to right and are configured with various associated delays (i.e. delay categories) T1 through TN 255 via the delay control processor 262 under direction for the control commands 208-B sent from the policy controller 250 (FIGS. 4 and 5). The storage locations 259 may be, for example, successively connected shift registers, flip flops, memory cells or another circuit or mechanism that allows data 205 to be transferred from one storage location 259 to the next (as will be explained). Alternative implementations may allow pointers to the data 205 in memory (i.e. memory storage locations 259) to be manipulated which simulate the movement of data 205 between the storage locations 259. Such a pointer implementation will be described in more detail later. The speed controller 260-1 is responsible for adjusting the delay of-data 205 deposited into the storage locations 259.

Generally, during operation of the arrangement in FIG. 7A, data 205 that is deposited in a storage location 259 can be successively transferred, shifted or switched from one storage location 259-N to another storage location 259-(N−1) until the data 205 arrives at the storage location 259-0. This is performed under control from the speed controller 260-1 which is guided by the information such as the rate provided in control commands 208-C. In this manner, the delay associated with the data 205 is adjusted. The delay associated with the first storage location 259-0 is preferably a predetermined delay transmit value, such as 0 microseconds. When the data 205 reaches (i.e. is shifted or transferred to) storage location 259-0, having an associated delay of T0, or 0 microseconds, the data 205 is next shifted or transferred to the transmission buffer 256 where it is transmitted from the delay manager 201 as scheduled data 205.

It should be understood that in the embodiment in FIG. 7A, the total number of predetermined storage locations 259 configured by step 301 in FIG. 6 determines the overall maximum delay that can be provided to data 205 in the delay manager 201. This is because adjusting the delay associated with data 205 is preferably accomplished by shifting the data 205 down the series of storage locations 259 until the last storage location 259-0 is reached, at which point the data 205 is transmitted. Alternative arrangements for adjusting the delay of data 205 over time will be discussed later.

FIG. 7B illustrates an alternative configuration of the storage locations 259. In the configuration shown in FIG. 7B, the delay associated with data 205 may be adjusted up or down. That is, the data 205 can be shifted from one storage location 259 to another, in either direction, left to right or right to left. Preferably, storage location 259-0 has an associated delay category T0 having a delay value of 0 (i.e., the predetermined transmit time), just as the embodiment in FIG. 7A. However, in the embodiment in FIG. 7A, data 205 can only be shifted from a storage location 259-N having a higher associated delay to a storage location 259-(N−1) having a lower associated delay, whereas in the embodiment in FIG. 7B, data 205 can be shifted from one storage location 259-N to another storage location having either a higher (259-(N+1)) or a lower (259-(N−1)) associated delay.

Referring back to the illustration in FIG. 5, each storage location 259 is arranged in a circular belt-like structure 253 to convey the concept of the capability to shift data from one storage location 259 to another, in either direction, as indicated by the arrows 256. The size of the conveyor belt-like structure is determined by how many storage locations 259 are established (Step 301 in FIG. 6) from the analysis of the network policy 207. Generally, as explained above, if the delay time or range between the lowest delay category value and the highest delay category value in the network policy 207 is large, then more storage locations 259 will be allocated. A However, in a simple configuration such as that shown in FIG. 5, there may be a one to one correlation between delay categories and storage locations 259 that are allocated.

An exception to this is when there are only delay categories for delays such as "high" and "low". In these instances, a delay category having a value of "high" may cause step 301 to allocate a number of storage locations 259, all having an associated "high" delay value. In this case, the controllers 260-1 and 260-2 (FIGS. 7A and 7B) are can simply wait a certain number of clock cycles equal to a predetermined "high" delay value before shifting data 205 to storage locations 259 of low delay or to the transmission buffer 256.

Preferably, all of the storage locations 259 have associated delays of the same magnitude. For example, a magnitude of 1 microsecond may be associated with each storage location 259. The magnitude is different than the delay category 255 or delay time or value associated with that storage location 259. The magnitude in a preferred embodiment represents the total time that data remains stored in any particular storage location between shift operations, whereas the delay time or delay category represents the total time data will be delayed in the series of storage locations 259 if inserted into a particular storage location 259. In other words, a delay category or delay value is the total time data 205 is to be delayed while present in all storage locations 259-0 through 259-N, and the magnitude is the time for delay in a single storage location.

Since many storage locations 259 may be coupled in succession with each other (e.g., FIGS. 7A and 7B), if the magnitudes of time for each storage location 259 are the same, by adding or removing storage locations 259 (via periodically executing steps 300, 301 and 302) from the series of configured storage locations 259-0 through 259-N, the overall maximum delay that can be provided by the series (i.e., the chain of storage locations 259) can be controlled. In this case, the individual delay categories 255 represent various points or positions along the series (i.e. as illustrated in FIGS. 7A and 7B) into which data 205 may be injected or inserted. Once data 205 is inserted in any storage location-259, as will be explained, the speed (or speed and direction) controllers 260-1 and 260-2 cause the data 205 to be propagated down the series of storage registers 259.

Returning now to the general operation of the invention as shown in FIG. 6, after the policy controller 250 has configured the delay categories (i.e., allocated storage locations 259) in step 301, in step 302, the policy controller 250 determines a rate at which to adjust the associated delay over time for data 205 that is deposited in each of the predetermined number of storage locations 259.

Preferably, the policy controller 250 determines a rate of delay adjustment by computing a speed at which to traverse the predetermined number of storage locations 259 to adjust the associated delay of data 205 over time for data-deposited in each storage locations 259. In an alternative embodiment (FIG. 7B), the rate includes both a speed and direction of traversal for storage locations 259. The rate adjustment information is conveyed to the delay manager 252 via the speed and direction control command(s) 208-C.

The speed and direction control commands 208-C are received by the speed controller 260-1 in FIG. 7A and by the speed and direction controller 260-2 for the embodiment in FIG. 7B. Each controller 260-1 and 260-2 controls the speed of operation (i.e., delay adjustment) of each storage location 259 based upon the commands 208-C. As illustrated, each controller 260-1 and 260-2 couples to each storage location 259. To control the speed or rate at which delays are adjusted for data 205 in each storage location 259, each controller 260-1, 260-2 is able to periodically signal to each storage location 259-N (where N is 1 to the predetermined number of storage locations configured by control commands 208-B) to instruct that storage location 259 to shift data 205 to another storage location 259.

An example using the configuration in FIG. 5 will help to explain how the speed and direction control commands 208-C (i.e., the rate) can be computed by the policy controller 250 and used to control the adjustment of delay over time for data 205 in the storage locations 259-0 through 259-10. As explained with respect to step 301 (FIG. 6), the policy controller 250 determines that there are 11 delay categories in the network policy 207 in Table 1 having delay values ranging from 0 to 100 microseconds. As such, eleven storage locations 259-0 through 259-10 are configured by step 301, each with a respective associated delay (i.e., one for each delay category). In step 302, by dividing the maximum delay category value (i.e., 100) by the total number of delay categories minus one, a value of 10 microseconds is obtained. This 10 microsecond value is the magnitude of delay configured for each storage location 259 and is communicated to the speed (or speed and direction) controller 260-1 or 260-2 (FIG. 7) in the delay controller 252. With this information, the delay-adjustment over time is accomplished for data 205 in each storage location 259 by the controllers 260-1 and 260-2 signaling to each location 259 to shift any data 205 contained therein to the next storage location every 10 microseconds. In this manner, the data 205 can be propagated down the series of storage locations 259-N through 259-0, at which point the data 205 is transmitted to the transmission buffer 256 for transmission onto network 100.

As discussed above, an example configuration based upon the sample network policy in Table 1 can provide more than the eleven storage locations 259-0 through 259-10. For instance, 100 storage locations may be provided, linked in series, and each can have an associated delay magnitude of 1 microsecond. In this manner, the shifting operations from controllers 260-1 and 260-2 may be signaled every microsecond, and data 205 would propagate from one location to the next each microsecond. In such a configuration, there can be nine storage locations 259 provided between each delay category location 259-0 through 259-10, which allows multiple portions of data 205 having the same delay category 255 to be deposited without overflow, so long as the number of portions of data 205 arriving at the delay manager 201 does not exceed the number of storage locations allocated for each delay category.

As noted above with respect to the storage location configuration process in step 301, in implementations of the invention which provide many storage locations 259 for each delay category 255, overflow may not be an issue since two different portions of data 205 arriving at the same time and requiring a storage location 259 having the same delay category can be accommodated. In such an implementation, a memory circuit for instance, that allows parallel bulk data transfers could be used to shift the data 205 in all storage locations 259 associated with one timeslot or delay category to another group of storage locations 259 associated with the next timeslot or delay category. That is, if groups of storage locations 259 are assigned common timeslots or delay categories, delay adjustments in step 306 (i.e. data shifts) can be done as a group or in bulk, with all data 205 being transferred from one group to another. As such, when many portions of data 205 are eventually shifted or transferred (i.e. their delays are collectively adjusted) to a group of storage locations 259 having a collective associated delay category or delay value equal to the predetermined delay transmit value (e.g. 0 microseconds of delay), the portions of data 205 can be transferred in bulk to one or more transmission buffers 256. In the case, multiple transmission-buffers 256 may exist, where each transmission buffer 256 serves a different physical (or logical) network connection or link (e.g., links 120 through 135 in FIG. 1). As such, many portions of data 205 can be released for transmission into the network (e.g., network 100) at one time if they have the same delay requirements.

For the configuration in FIG. 7A, data 205 may be shifted only from a storage location 259-N having a high associated delay 255 to a storage location 259-(N−1) having lower associated delay 255. This is unidirectional delay management, in that the remaining delay of data 205 is always decreased as the delay of data 205 is adjusted over time.

For the configuration in FIG. 7B, data 205 may be shifted either from a storage location 259-N having a high associated delay 255 to a storage location 259-(N−1) having lower associated delay 255, or data 205 may be shifted from a storage location 259-N having a low associated delay 255 to a storage location 259-(N+1) having a higher associated delay. This is called bi-directional delay management, in that the remaining delay of data 205 can be either decreased or increased as the delay of data is adjusted over time. One example reason for allowing the delay of data 205 to be increased by shifting the data 205 backwards (i.e., away from the storage location 259-0 having the predetermined transmit time) in the series of storage locations 259 is that new data 205 may arrive at the delay manager having a higher priority than any data 205 currently in the series of storage locations 259. In such an event, if the data 205 already existing in the queue can be shifted backwards (i.e., away from the direction of location 259-0), room (i.e., a vacant storage location having a low delay category value such as T0 or T1) can be made available in a storage location 259 for the newly arriving high priority data 205.

Returning again to the description of processing in FIG. 6, it has thus far been explained how the delay categories 255 and associated storage locations 259 can be configured and how a rate of adjustment of delay over time for data in the storage locations 259 can be computed, all based on the network policy 207.

Step 301 provides the ability to add or remove storage locations 259 from the series of storage locations 259-0 through 259-N each time the step is performed. As such, the invention allows the delay manager 201 to reconfigure itself if changes appear in the network policy 207. That is, the invention allows changes to be made at any time in the network policy 207, such as the addition or removal of delay categories and/or data attributes. In response, a delay manager configured with the invention can periodically re-execute steps 300 through 302, as illustrated by the periodic re-execution line 310. Alternatively, re-execution of steps 301 through 303 can be triggered by the arrival or manual loading of new network policy information 207 into the data communications device 200. In this manner, the policy controller 250 in the delay manager(s) 201 in the data communications device(s) on network 100 periodically obtain the latest version of the network policy 207 from the network policy server 150 and can reconfigure the delay scheduler 251 and delay controller 252 via control commands 208 as previously described. This allows each data communications device 200 in an entire network to adapt to changes in a distributed network policy 207 with respect to the delay of data 205. Thus if new data types or data having new attributes becomes present on a network, the data communications devices 200 that use this invention can adapt to the new delay requirements without manually updating hardware or software within the devices 200.

This aspect of the invention thus ensures that a networked data communications device 200 is able to update itself with the latest network policy 207. Prior art network policy updates are typically performed by sending the network policy to each device by an affirmative act on the part of the network policy server 150. This invention eliminates the need to do this and places the burden for obtaining network policy updates on the data communication devices 200 themselves. As such, if there are hundreds or thousands of data communications devices 200 in the network, the load caused by network policy updates is distributed across each device.

The remaining processing steps 303 through 309 control the general transfer and delay of data 205 in the delay manager 201 configured according to the invention.

In step 303, the data scheduler 251 accepts portions of the unscheduled data 205. The portions of data 205 may be a steady or bursty stream of packets or cells, for example. The data scheduler 251 then determines, in step 304, a delay category associated with the portions of data 205, as each portion of data 205 enters the data scheduler 251. As explained above, the policy controller 250 has, at this point in the processing, provided the delay scheduler 251 with a list of delay attributes and associated maximum and minimum delay categories determined from the analysis of the network policy 207 (i.e., via control commands 208-A). Using this information, in step 304, the data scheduler 251 examines the data 205 to determine one or more attributes associated with the data 205.

As explained with respect to FIG. 2, each portion of the data 205 is arranged in a predefined format (i.e., a packet, cell, frame, or the like) and may contain information in various fields 280 through 284 that matches one or more attributes specified in the network policy 207. Once an attribute of the data 205 is determined in step 304, the step can associated a delay category with that attribute, and thus can determine the delay associated with that data 205.

It may be the case that more than one attribute from the network policy 207 matches a portion of data 205. In such instances, a priority may be established between the attributes to allow the data scheduler 251 to select one attribute over others and to assign a delay category associated with that attribute to the data 205. Preferably, the minimum delay category value (i.e., delay value) for an attribute is initially assigned to the data 205 matching that attribute.

Once the delay (e.g., one of delay categories (255) T0 through T10 in FIG. 5) has been determined for the data 205, in step 305, the data scheduler 251 deposits the data 205 into a selected storage location 259 selected from the predetermined number of storage locations 259-0 through 259-N. The selected storage location 259 preferably has an associated delay (as configured via delay category control commands 208-B) that generally corresponds to the delay (i.e. delay category value) determined to be associated with the data 205. In other words, the data scheduler 251 determines the delay associated with data 205 (step 304) and then deposits the data 205 (Step 305) into a storage location 259 having a delay category 255 that substantially or exactly matches the delay associated with the data 205.

It may be the case that the storage location 259 into which the data scheduler 251 attempts to deposit data 205 is already occupied with another portion of data 205. If this occurs, the data scheduler 251 can attempt to place the data 205 into another storage 259 location having an associated delay that falls between the maximum and minimum delay categories for the attribute that was associated with the data 205. In other words, if one storage location 259 is full, the data scheduler 251 can attempt to put the data to be scheduled into another storage location 259 that has an associated delay with the delay range (maximum and minimum delay category values) of the data 205.

For example, as noted above, step 301 may allocate 101 storage locations for the network policy 207 shown in Table 1 (for delay values ranging from 0 to 100), and delay categories 255 would be established at every $10^{th}$ storage location. Thus, the T1 delay category corresponding to a delay value of 10 would be established at the $10^{th}$ storage location, while the T2 delay category corresponding to a delay value of 20 would be established at the $20^{th}$ storage location, and so on. However, between each of these delay categories, there would also be allocated nine storage locations which do not have any particular associated delay category 255.

During the data scheduling process of step 305, if a portion of data 205 has an associated delay of 20, the data scheduler 251 first attempts to deposit the data 205 into the storage location 259 associated with the delay category (i.e., having an associated delay) of 20. However, if this 20 microsecond delay location 259 is already occupied with data (e.g., other data that may have been shifted in from a higher delay location), the data scheduler 251 begins to successively examine storage locations 259 beginning at location number 21 (relative to storage location 0) and proceeding to the location 259 associated with the maximum delay category associated with the attribute of the data 205. As soon as the data scheduler 251 finds an unoccupied storage location 259, it successfully deposits the data 205 into the vacant location 259. As long as the location 259 of deposit exists between the locations 259 having associated delay categories for the maximum and minimum delays for that data 205, the data 205 is guaranteed to be delayed an acceptable amount of time. In other words, if the data scheduler 251 cannot copy the data 205 into the storage location 259 allocated for the minimum delay category for the data 205, then any empty storage location 259 having an associated delay between the minimum delay category and the maximum delay category for this data 205 will be used. This insures that the data 205 will be delayed by an amount of time that is greater than or equal to the minimum required delay, but that is less than or equal to the maximum allowed delay. This also solves problems of congestion and added delay that might occur if data 205 had to be buffered in the data scheduler 251 while awaiting an empty storage location 259.

Alternatively, the data scheduler 251 may find that there are no empty storage locations available during an attempt to deposit data 205 into a storage location 259 in step 305. This situation may arise under heavy data communication traffic loads. In this alternative embodiment, data may be placed in a storage location 259 outside the maximum or minimum delay bounds or a priority may be established for the different data attributes. Using the priority in this situation, the data scheduler 251 in step 305 can simply pre-empt or knock out the data 205 that already exists in one of the occupied storage locations 259, as long as the data 205 being pre-empted has an attribute that is lower in priority than the attribute of the data 205 being scheduled. In other words, under heavy load conditions where there are no more empty storage locations 259, the data scheduler 251 can continue to schedule high priority data 205 by simply overwriting lower priority data. The loss of the lower priority data 205 can be accommodated for by higher level network protocols using retransmissions or negative acknowledgements, for example.

Steps 306 and 307 adjust the delay of the data 205 in each storage location 259 (step 206) and then determine if the delay of the data 205 in a storage location is equal to the delay transmit value (i.e. 0). Steps 306 and 307 are preferably executed asynchronously in relation to steps 303 through 305 and are controlled by the speed or speed and direction controllers 260-1 or 260-2, depending upon the embodiment in use. That is, step 306 and 307 can take place concurrently with most of the operations in steps 303 and 305. The only requirement is that embodiments that adjust delays associated with data 205 over time by shifting the data 205 from one storage location 259 to the next do not attempt to adjust the delay (i.e. shift data) as step 305 deposits data into a storage location 259.

Generally, the operation of step 306, delay adjustment, operates as explained above. That is, the data is shifted down the row or series of storage locations 259, from one to the next, thereby decreasing (or increasing if shifted backwards in FIG. 7B) the delay associated with the data 205. If step 307 determines that the delay associated with data 205 in a storage location 259 has a delay equal to a predetermined delay transmit value (i.e., 0), then step 308 is performed with obtains the data in the storage location having a delay equal to the delay transmit value and step 309 transfers the data 205 to the transmission buffer (FIG. 5) for transmission. Step 308 is implemented in a preferred embodiment by transferring any data 205 in the storage location 259-0 to the transmission buffer 256 for transmission onto a network, such as network 100 each adjustment of the delay of time for all portions of data in the storage locations 259.

Alternatively, step 307 may perform a look-back operation if the storage location 259-0 is empty. That is, as data 205 is processed the delay manager 201 under light load conditions, only a few storage locations 259 may contain data 205. For example, storage locations 259-0, 259-1, 259-2, 259-3 and 259-4 may all be empty, with the first occupied location being 259-5. After each delay adjustment operation (step 306), the speed controller 260-1 or 260-2 may determine that there is no data 205 in storage location 259-0 (the storage location having the predetermined delay transmit value) to be transferred to the transmission buffer 256. As such, step 307 may examine locations further up the series of storage locations (i.e., locations from 259-1 through 259-5) for the next available portion of data 205 that can be transmitted. Once an occupied storage location is found (i.e. storage location 259-5), step 307 can determine if transferring the data 205 in the first encountered, non-empty storage location (259-5 in this example) would violate the delay characteristics (i.e., minimum delay category value) for the data 205 in location 259-5, as governed by the network policy 207. If not, step 307 may simply proceed to step 308 and 309 as explained above, and the data 205 in location 259-5 is advanced to the transmission buffer 256 for transmission. In this manner, network bandwidth can be maximally utilized so long as delay policies for data are adhered.

As discussed above, adjusting the delay over time can be performed by shifting the data 205 from one storage location 259 to the next. Alternatively, delay adjustment can be accomplished by shifting pointers representing the associated delay categories 255 (i.e. delays) from one storage location 259 to the next. Instead of shifting the data 205 from one location 259 to the next to adjust delays, a set of pointers can be established by control commands 208-B, in conjunction with the allocation of storage locations 259. The pointers essentially replicate the delay categories 255 as illustrated in FIGS. 7A and 7B. Using this mechanism, to adjust delays of data over time as per step 306, the delay category pointers are merely shifted to the left (or left or right in FIG. 7B) by the speed controllers 260-1 and 260-2 (FIGS. 7A and 7B) at the prescribed rate for the storage locations 259. Then, when the delay category pointer for the T0 delay category is shifted, the data 205 in the location 259 from which the T0 pointer is shifted is then transmitted via the delay controller 252 to the transmission buffer 256 for transmission onto the network 100. In this manner, the data 205 stays put in storage locations 259, and the pointers 255 for each delay category T0 through TN are circularly rotated through the storage locations.

The rate or speed at which the data or pointers are shifted or moved from one storage location 259 to the next is the rate of adjustment and is preferably computed by the policy controller 250, as explained above. Using pointers to adjust delays can be implemented as a rotating queue structure, for example. From the foregoing description, those skilled in the art of list and data processing mechanisms will appreciate that there are a number of variations of data structures, queue, linked lists, stacks, heaps and other mechanisms that can be used to achieve a similar effect, without deviating from the scope or spirit of the present invention.

The invention applies to all types of data transmitted to or from any type of device through any type of network and/or network communications medium. An alternative scenario that could illustrate the features of the invention would be to have several networked computers each running different types of applications having different data communications requirements. The data produced from each application may need to be transferred between the computers at different rates. The invention could be used to provide this capability.

While this invention has been particularly shown and described with references to preferred embodiments thereof, it will be understood by those skilled in the art that various changes in form and details may be made therein without departing from the spirit and scope of the invention as defined by the appended claims. The foregoing description of embodiments of the invention are not intended to be limiting. Rather, any limitations to the invention are presented in the following claims.

What is claimed is:

1. A method for managing delay of data in a data communications device, the method comprising the steps of:
   configuring a predetermined number of storage locations to store data passing through the data communications device, each storage location having an associated delay;
   determining a direction and speed in which to traverse the predetermined number of storage locations to adjust the associated delay over time for data deposited in each of the predetermined number of storage locations;
   accepting data;
   determining a delay associated with the data;
   depositing the data into a selected storage location selected from the predetermined number of storage locations, the selected storage location having an associated delay generally corresponding to the delay determined to be associated with the data;
   adjusting the associated delay over time of data deposited in each of the predetermined number of storage locations; and
   transmitting data deposited in a storage location that has an associated delay generally equal to a predetermined delay transmit value.

2. The method of claim 1 wherein the step of configuring a predetermined number of storage locations includes the steps of:
   determining a required number of delay categories associated with data that can be transmitted through the data communications device;
   determining the predetermined number of storage locations to establish based upon the required number of delay categories determined to be required; and
   determining a rate at which to adjust the associated delay over time for data deposited in each of the predetermined number of storage locations, wherein a total number of the predetermined number of storage locations determines an overall maximum delay associated with the predetermined number of storage locations.

3. The method of claim 2 wherein the step of determining the predetermined number of storage locations includes the step of:
   selecting the predetermined number of storage locations from a series of interconnected registers, wherein each register selected corresponds to one of the delay categories.

4. The method of claim 2 wherein the step of determining a required number of delay categories determines the number of delay categories based upon a network policy provided by a network policy server.

5. The method of claim 1 wherein;
   the step of adjusting the associated delay over time for data deposited in each of the predetermined number of storage locations transfers the data in each respective storage location to a storage location having a lower associated delay, such that successive adjusting steps move data from storage locations having high associated delays to storage locations having lower associated delays; and
   wherein the step of transmitting data transmits data deposited in a storage location having a lowest delay transmit value.

6. The method of claim 1 wherein:
   the step of accepting data accepts data from a network port of the data communications device; and
   wherein the step of transmitting data transmits data to a data processor within the data communications device, such that the delay associated with data is controlled as the data arrives at the data communications device.

7. The method of claim 1 wherein:
   the step of accepting data accepts data from a data processor within the data communications device; and wherein the step of transmitting data transmits data to a network port of the data communications device, such that the delay associated with data is controlled as the data awaits transmission from the data communications device.

8. The method of claim 1 wherein the step of determining a delay associated with the data includes the steps of:

determining an attribute associated with the data; and assigning the delay associated with the data based upon the attribute determined.

9. The method of claim 8 wherein the step of determining the attribute selects an attribute based upon one of a source of the data, a destination of the data, a protocol used to transfer the data, an application associated with the data, a type of service associated with the data, and a data type associated with the data.

10. The method of claim 8 wherein the step of determining an attribute associated with the data determines the attribute based upon information contained within the data itself.

11. The method of claim 1 wherein:

the step of configuring a predetermined number of storage locations configures the storage locations based on delay categories defined in a network policy, and a plurality of storage locations are configured for each delay category; and wherein the step of adjusting collectively adjusts the delay for each storage location associated with each delay category so as to concurrently adjust the delays for all storage locations associated with a particular delay; and wherein the step of transmitting data concurrently transmits data deposited into each of the plurality of storage locations associated with a delay category resulting in a bulk on transfer of data.

12. The method of claim 1 wherein the step of configuring a predetermined number of storage locations configures the predetermined number of storage locations based upon a network policy and wherein the method further includes the steps of:

obtaining an update to the network policy; and reconfiguring the predetermined number of storage locations during operation of the data communications device to allow controlling a delay for data to be transmitted through the data communications device according to the update to the network policy.

13. A computer for managing delay of data in a data communications device, the computer configured to:

configure a predetermined number of storage locations to store data passing through the data communications device, each storage location having an associated delay;

determine a direction and speed in which to traverse the predetermined number of storage locations to adjust the associated delay over time for data deposited in each of the predetermined number of storage locations;

accept data;

determine a delay associated with the data;

deposit the data into a selected storage location selected from the predetermined number of storage locations, the selected storage location having an associated delay generally corresponding to the delay determined to be associated with the data;

adjust the associated delay over time of data deposited in each of the predetermined number of storage locations; and transmit data deposited in a storage location that has an associated delay generally equal to a predetermined delay transmit value.

14. The computer of claim 13 wherein, when configuring a predetermined number of storage locations, the computer is configured to:

determine a required number of delay categories associated with data that can be transmitted through the data communications device;

determine the predetermined number of storage locations to establish based upon the required number of delay categories determined to be required; and determine a rate at which to adjust the associated delay over time for data deposited in each of the predetermined number of storage locations, wherein a total number of the predetermined number of storage locations determines an overall maximum delay associated with the predetermined number of storage locations.

15. The computer of claim 14 wherein, when determining the predetermined number of storage locations, the computer is configured to:

select the predetermined number of storage locations from a series of interconnected registers, wherein each register selected corresponds to one of the delay categories.

16. The method of claim 14 wherein, when determining a required number of delay categories, the computer is configured to determine the number of delay categories based upon a network policy provided by a network policy server.

17. The computer of claim 13 wherein:

when adjusting the associated delay over time for data deposited in each of the predetermined number of storage locations, the computer is configured to transfer the data in each respective storage location to a storage location having a lower associated delay, such that successive adjusting steps move data from storage locations having high associated delays to storage locations having lower associated delays; and when transmitting data, the computer is configured to transmit data deposited in a storage location having a lowest delay transmit value.

18. The computer of claim 13 wherein:

when accepting data, the computer is configured to accept data from a network port of the data communications device; and when transmitting data, the computer is configured to transmit data to a data processor within the data communications device, such that the delay associated with data is controlled as the data arrives at the data communications device.

19. The computer of claim 13 wherein:

when accepting data, the computer is configured to accept data from a delta processor within the data communications device; and when transmitting data, the computer is configured to transmit data to a network port of the data communications device, such that the delay associated with data is controlled as the data awaits transmission from the data communications device.

20. The computer of claim 13 wherein, when determining a delay associated with the data, the computer is configured to:

determine an attribute associated with the data; and assign the delay associated with the data based upon the attribute determined.

21. The computer of claim 20 wherein, when determining the attribute, the computer is configured to select an attribute based upon one of a source of the data, a destination of the data, a protocol used to transfer the data, an application associated with the data, a type of service associated with the data, and a data type associated with the data.

22. The computer of claim 20 wherein, when determining an attribute associated with the data, the computer is configured to determine the attribute based upon information contained within the data itself.

23. The computer of claim 13 wherein:
when configuring a predetermined number of storage locations, the computer is configured to configure the storage locations based on delay categories defined in a network policy, and a plurality of storage locations are configured for each delay category;
when adjusting, the computer is configured to collectively adjust the delay for each storage location associated with each delay category so as to concurrently adjust the delays for all storage locations associated with a particular delay; and
when transmitting data, the computer is configured to concurrently transmit data deposited into each of the plurality of storage locations associated with a delay category resulting in a bulk transfer of data.

24. The computer of claim 13 wherein, when configuring a predetermined number of storage locations, the computer is configured to configure the predetermined number of storage locations based upon a network policy and wherein the computer is further configured to:
obtain an update to the network policy; and
reconfigure the predetermined number of storage locations during operation of the data communications device to allow controlling a delay for data to be transmitted through the data communications device according to the update to the network policy.

\* \* \* \* \*

UNITED STATES PATENT AND TRADEMARK OFFICE
CERTIFICATE OF CORRECTION

PATENT NO. : 6,539,026 B1
DATED : September 3, 2003
INVENTOR(S) : John G. Waclawsky It is certified that error appears in the above-identified patent and that said Letters Patent is hereby corrected as shown below:

Column 25,
Line 34, "a bulk on transfer of data" should read -- a bulk transfer of data --

Column 26,
Line 53, "from a delta processor" should read -- from a data processor --

Signed and Sealed this

Seventh Day of October, 2003

JAMES E. ROGAN
*Director of the United States Patent and Trademark Office*